United States Patent [19]
Dovell et al.

[11] 3,752,267

[45] Aug. 14, 1973

[54] DISC BRAKE MECHANISM

[75] Inventors: Clark W. Dovell, Potomac; Gerhard B. Winkler, Rockville, both of Md.

[73] Assignee: The United States of America as represented by the Secretary of the Navy

[22] Filed: Dec. 7, 1971

[21] Appl. No.: 205,690

[52] U.S. Cl.............. 188/171, 188/71.5, 192/70.17
[51] Int. Cl............................................. B60t 13/04
[58] Field of Search................. 188/71.1, 71.5, 171; 192/70.16, 70.17, 70.18, 106.1

[56] References Cited
UNITED STATES PATENTS

| | | | |
|---|---|---|---|
| 2,217,464 | 10/1940 | Arnold | 188/171 |
| 2,423,011 | 6/1947 | DuBois | 188/71.5 |
| 2,917,135 | 12/1959 | Hirzel | 188/71.1 X |

Primary Examiner—Duane A. Reger
Attorney—R. S. Sciascia, J. A. Cooke, et al

[57] ABSTRACT

A brake mechanism including a housing adapted to receive a rotating shaft, the housing having a plurality of annular discs fixed thereto. The shaft is coupled to a second plurality of discs alternately spaced with the first plurality. A pressure plate is provided to engage the disc assembly under the action of a spring when an electromagnetic coil is deactivated. The discs coupled to the shaft have notches formed therein of varying size which cooperate with fingers formed on a spider member so as to provide an incrementally increasing braking torque to the shaft upon actuation of the brake.

5 Claims, 6 Drawing Figures

DISC BRAKE MECHANISM

BACKGROUND OF THE INVENTION

This invention relates generally to a brake system, and more particularly to brake apparatus of the disc type wherein the brake is incrementally applied by spring means and is released by electromagnetic means.

Many different types of apparatus are known whose purposes are to cause a rotating shaft to cease rotating. Among these various devices, one that has attained wide usage is the disc type brake. In its most commonly found embodiment, the disc type brake includes a plurality of annular discs fixed to the rotating shaft at spaced intervals. Positioned intermediate of the spaced rotating discs are a complementary number of stationary annular discs fixedly attached to the brake housing. A pressure plate is normally provided which is spring biased against the outermost one of the discs but is held in a non-contacting position by various conventional means such, for example, as electromagnetic means. When the rotation of the shaft is to be abated, the electromagnetic means are deactivated thereby permitting the pressure plate to urgingly contact the outermost pressure plate mentioned hereinabove under the force of the spring biasing.

A major problem has arisen, however, in the use of these devices in certain applications such as when the rotating shaft is used as a wire dispensing and/or storage spool for lowering apparatus into deep ocean areas. For example, the wire may be paid out under the force of a heavy mass being lowered as the spool rotates and, upon a sufficient length of wire having been unwound, the rotation of the shaft is stopped. Problems have arisen, however, when such shaft is stopped by conventional disc brake means. More particularly, when such conventional apparatus is employed, the braking torque applied to the rotating shaft is quite sudden and approaches the application of a shock loading by the braking torque. The suddenness of the torque increase has, in many instances, caused the wire which is being paid out to snap due to the sudden application of force. Obviously, when valuable or expensive material is being lowered into water, the rupture of the wire represents a costly loss of both money and time.

Additional problems inherent in the use of conventional disc brake mechanisms are that such mechanisms are often quite bulky and are difficult to move around. Also, expensive fine tuning of each individual brake is often necessary when conventional disc brake apparatus is used.

SUMMARY OF THE INVENTION

Accordingly, one object of this invention is to provide a new and improved brake mechanism.

Another object of the invention is the provision of a new and improved disc brake mechanism.

Still another object of the present invention is to provide a new and improved electromagnetic actuatable disc brake mechanism.

A further object of the instant invention is to provide a new and improved disc brake mechanism which provides an incrementally increasing breaking torque.

Briefly, in accordance with one embodiment of this invention, these and other objects are attained by providing a housing adapted to receive a rotating shaft, and with a plurality of spaced discs fixed thereto. A second plurality of discs are alternately positioned among the fixed discs and are coupled to the rotating shaft. A pressure plate is normally held apart from the braking discs by electromagnetic means. When the electromagnetic means are deactivated, spring means cause the pressure plate to move into contact with the disc arrangement thereby applying a braking torque to the shaft. The disc coupled to the shaft are so formed and adapted so as to apply an incrementally increasing braking torque to the shaft.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
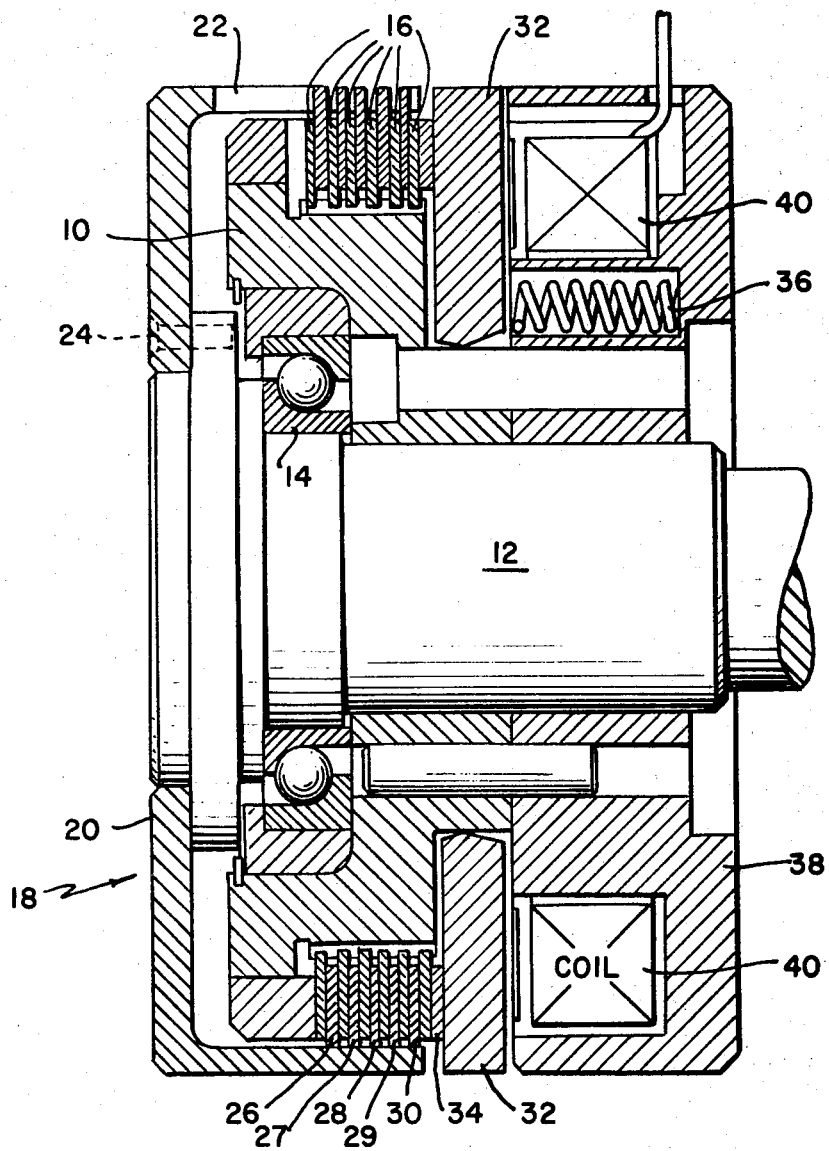
FIG. 1 is a side view in section of the overall brake mechanism according to the present invention.

Referring now to the drawings wherein like reference characters designate identical or corresponding parts throughout the several views, and more particularly to FIG. 1 thereof, the brake mechanism is shown as comprising a housing 10 in which shaft 12 is rotatably mounted by means of a ball bearing 14. A plurality of annular braking discs 16 are splined to the housing in a conventional manner. Any suitable material may be employed for disc 16, such for example as bronze. A spider member 18 comprising a circular disc 20 and six perpendicularly extending fingers 22 is fixedly connected to the shaft 12 be conventional means such as bolt 24.

A second plurality of annular discs 26 through 30 are individually alternately spaced between adjacent fixed discs 16 and coupled to spider member 18 by virtue of fingers 22 extending into a series of notches formed in discs 26 through 30 which will be described in greater detail hereinbelow. Thus, discs 26 through 30 are rotatable with shaft 12.

An annular pressure plate 32 is provided around housing 10 substantially adjacent to the outermost fixed disc 16. An annular friction surface 34 is provided on pressure plate 32 and is appropriately positioned so as to come into contact with this outermost disc 16 when pressure plate 32 is caused to move to the left as shown in FIG. 1. A series of compression springs 36 (only one of which is shown) normally biases pressure plate 32 in the direction of the disc assembly, the disc assembly comprising the first and second plurality of discs.

A second housing 38 is provided to enclose an electromagnetic coil 40. Electromagnetic coil 40 is in a normally activated mode, i.e., an electric voltage is normally applied thereto, which thereby causes the coil to exert a magnetic force on pressure plate 32 which is of a ferromagnetic material. This magnetic force normally prevents friction surface 34 from contacting outermost fixed disc 16. When the electromagnetic coil 40 is deactivated, pressure plate 32 is allowed to move under the force of compression springs 36 so as to exert a pressure against the disc assembly thereby resulting in a braking torque to slow up and stop rotating shaft 12.

As mentioned hereinabove, the braking torque applied in prior art brake mechanisms has normally been of an approximately instantaneous nature thereby imparting a substantial shock loading to any apparatus being driven by shaft 12, such, for example, as a length of wire wound therearound. The particular disc structure and accompanying apparatus of the present invention eliminates this undesirable effect. In particular, referring to FIGS. 2 and 3, the particular structure of discs 26 through 30 and spider member 18 is more clearly shown. Turning to FIG. 3a, the configuration of discs 26 and 27 which are identical is shown as comprising an annular ring having a series of equally spaced notches 42 of equal size formed on the outer perimeter thereof. The width of each notch 42 is substantially the same as the width of fingers 22 of spider member 18 so as to allow these notches to receive the fingers with only a minute amount of clearance. In the present embodiment, there are two discs, namely discs 26 and 27 having the identical configuration. By virtue of the close tolerance between the wicth of fingers 22 and the size of notches 42, discs 26 and 27 are caused to move with spider member 18 and therefore, with shaft 12 at all times.

Figure 2:
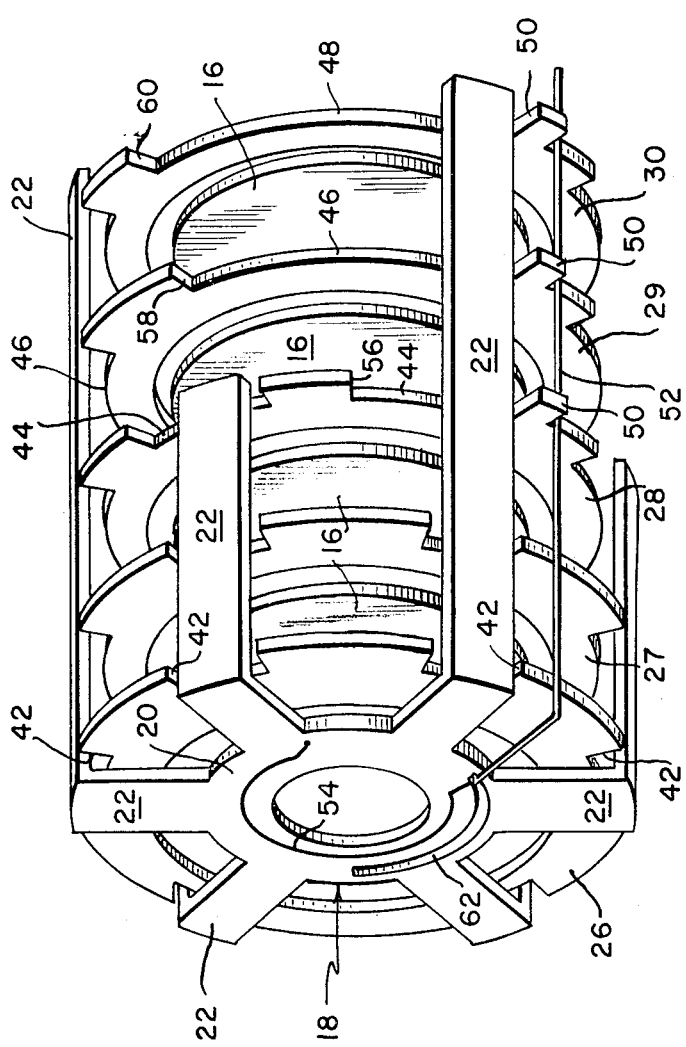
FIG. 2 is an exploded view in perspective of the disc and assembly of the present invention wherein the spider element is distorted in size for the sake of clarity.
Figure 3A:
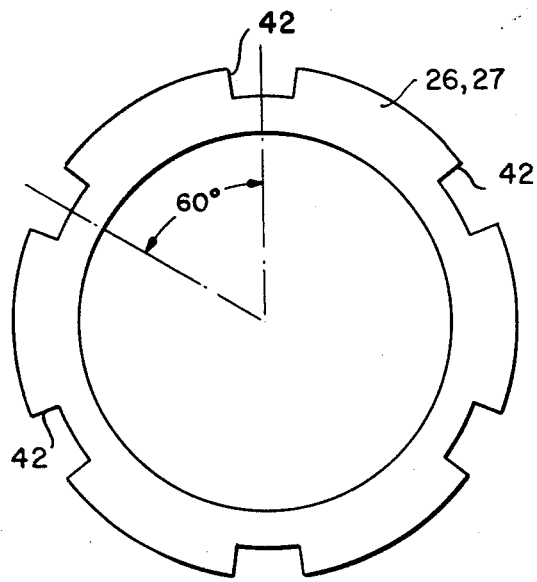
FIG. 3 a through d are plan views of the individual discs which are coupled to the shaft of the brake mechanism of the present invention.
Figure 3B:
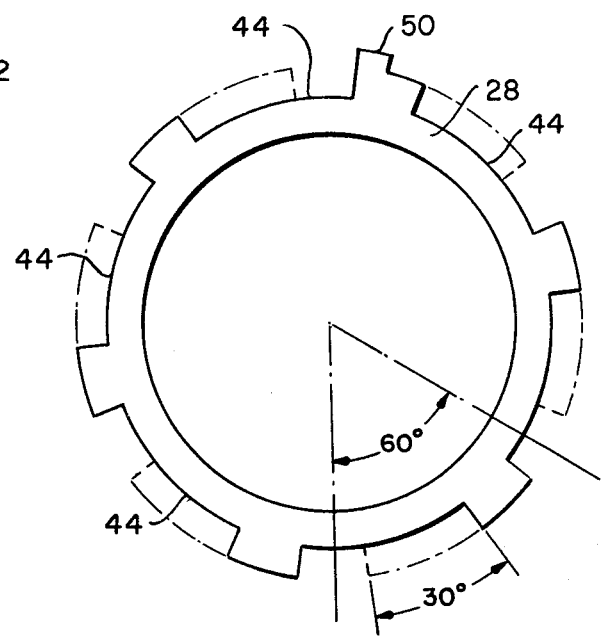

Turning to FIG. 3b, the configuration of friction discs 28 is shown as including an annular ring having a series of spaced notches 44 of equal size and spacing similarly formed as in the case of discs 26 and 27. The size of notches 44 equal the size of notches 42 plus an additional 30° as shown by the shaded areas in the figure which have been provided for the sake of clarity. Notches 44 also receive fingers 22 as shown in FIG. 2, the positioning of which will be explained in greater detail hereinbelow.

Figure 3C:
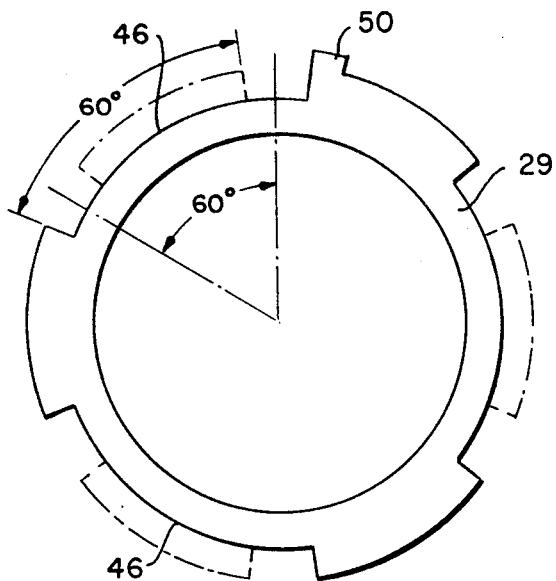
Figure 3D:
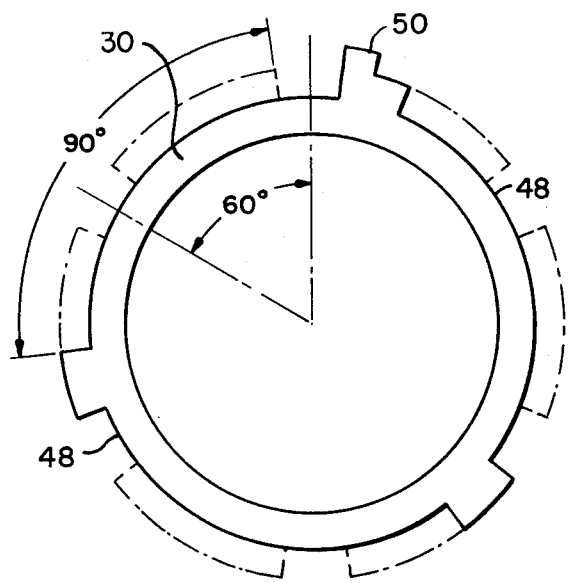

Referring to FIGS. 3c and 3d in a similar manner, discs 29 and 30 are formed with notches 46 and 48 respectively having widths equal to the width of notch 42 plus 60° and 90° respectively. Again, these additional widths are shown by shaded areas.

Referring now to FIG. 2, the positioning of discs 26 through 30 with respect to spider member 18 is illustrated. In order to facilitate the description of the apparatus, the fingers 22 of the spider member are shown disproportionately elongated in order to be in an appropriate position in the exploded perspective view. As described hereinabove, the two sets of six equally spaced notches 42 in discs 26 and 27 are aligned and receive the six fingers 22. Thus, these discs are fixed relative to spider member 18. In each of the remaining three discs, i.e., discs 28, 29 and 30, a small projection 50 is formed contiguous with a trailing edge of one of the respective notches. As shown in FIG. 2, this trailing edge of each respective notch in the three discs is held against finger 22 by a push rod 52. Push rod 52 is connected to the circular disc 20 of spider member 18 by a connecting spring 54. The push rod 52 is urged against the sides of projection 50 by spring 54 thereby retaining the trailing edges of the respective notches in contact therewith. Thus, as best seen in FIG. 2, discs 28 through 30 are angularly movable with respect to spider member 18 once the force of spring 54 on push rod 52 is overcome, at least to the extent of the increased widths of notches 44, 46 and 48. Alternate fingers 22 of spider member 18 are shorter relative to the adjacent fingers terminating above discs 29 and 30 for reasons which will be made clearer during the discussion of the operation of the device.

In operation, shaft 12 is normally rotated by an external driving mechanism. When it is desired to stop this rotation, electromagnetic coil 40 is deactivated thereby allowing pressure plate 32 to move towards the disc assembly under the action of springs 36. It is to be noted that the positions of discs 26 through 30 relative to spider member 18 are substantially as shown in FIG. 2 throughout rotation of shaft 12. As described hereinabove, the positions of discs 28 through 30 during rotation of shaft 12 is maintained by the force of push rod 52 forcing projections 50 to bear against the edge of finger 22. When the pressure plate 32 comes into contact with outermost fixed disc 16 as shown in FIG. 1, the disc assembly is compressed thereby causing a braking torque to be applied through spider member 18 to shaft 12. Due to the relatively large mass of shaft 12, however, the shaft and, consequently, the spider member is caused to continue to rotate despite the braking torque. In fact, the only effective braking torque transmitted to shaft 12 is due to discs 26 and 27 initially since the fingers of spider member 18 are restrained only in the smaller notches of these discs. Thus, as the shaft 12 continues to rotate, discs 26 and 27 are caused to rotate therewith. However, due to the increased width of notches 44, 46 and 48 in discs 28, 29 and 30, discs 28 through 30 remain fixed. This is faciliated by appropriately choosing the connecting spring 54 and disc characteristics so that the force exerted on projections 50 by push rod 52 is less than the frictional force exerted on discs 28 through 30 to be adjacent disc 16 due to the pressure of pressure plate 32 which causes the discs to remain stationary. After the shaft 12 has rotated an additional 30°, the braking torque of disc 28 becomes effective when the leading edge 56 of notch 44 is contacted by finger 22. Similarly, the action of discs 29 and 30 come into play as the spider rotates with the shaft through an additional 60 and 90 degrees respectively, that is, when leading edges 58 and 60 of notches 46 and 48 are contacted by finger 22. In this manner, an incrementally increasing braking torque is applied to shaft 12 through spider 18. Alternate fingers 22 are shortened in order to avoid interference with the edges of notches formed in discs 29 and 30. Further, as the spider rotates with discs 28 through 30 stationary, push rod 52 is caused to move in groove 62 in an opposite direction.

After the shaft 12 comes to rest and it is desired to rotate it again, electromagnetic coil 40 is activated thereby withdrawing pressure plate 32 from contact with the disc assembly. This causes the extinguishment of any frictional forces between the individual discs. Under the action of connecting spring 54, push rod 52 resets the positions of discs 28 through 30 by pushing projections 50 into contact with finger 22.

Obviously, numerous modifications and variations of the present invention are possible in the light of the above teachings. For example, different numbers of discs with different angular spacing and sizes of notches may be used rather than those shown in the preferred embodiment, according to the type of loading desired. Further, the brake may be employed as a clutch to initiate shaft rotation since a clutch may be considered the equivalent of a brake. It is therefore to be understood that, within the scope of the appended claims, the invention may be practiced otherwise than as specifically described herein.

What is claimed as new and desired to be secured by Letters Patent of the United States is:

1. A brake mechanism comprising:

a housing adapted to receive a longitudinally extending rotating shaft;

a first plurality of spaced discs fixed to said housing;

a second plurality of discs alternately arranged among said first plurality of discs, said second plurality of discs coupled to said rotating shaft;

a pressure plate mounted substantially adjacent to and adapted to frictionally engage and apply axial pressure to one of said first plurality of discs;

spring means for effecting engagement of said pressure plate with said one of said first plurality discs;

electromagnetic solenoid means for effecting disengagement of said pressure plate from said one of said first plurality of discs, a spider member connectable to said shaft and rotatable therewith, including at least one longitudinally extending finger having a predetermined width; and said second plurality of discs including a first at least one disc having angularly spaced notches formed therein of a size substantially equal to said predetermined width of said finger; and a second at least one disc having angularly spaced notches formed therein of a size substantially larger than said predetermined width, said finger adapted to be received in one of said notches in said first at least one disc and in one of said notches in said second at least one disc, thereby applying an incrementally increasing braking torque to said rotating shaft upon engagement of said pressure plate with said one of said first plurality of discs.

2. A brake mechanism as recited in claim 1 further including:

a projection formed on said second at least one disc at the trailing edge of one of said notches formed therein; and a longitudinally extending push rod connected by a spring to said spider, said rod adapted to engate said projection and normally urge said projection against said finger.

3. A brake mechanism as defined in claim 2 wherein said connecting spring and disc characteristics are such that the force exerted on said projection by said push rod is less than the frictional force exerted on said second at least one disc by the iMmediately adjacent discs when said spring means effects engagement of said discs.

4. A brake mechanism as defined in claim 3 wherein said first at least one disc includes two discs having identically angularly spaced notches formed therein of a size substantially equal to said predetermined width of said finger.

5. A brake mechanism as defined in claim 4 wherein said second at least one disc includes three discs, said three discs having respective angularly spaced notches formed therein having sizes equal to said predetermined finger width plus 30°, 60° and 90° respectively.

* * * * *